US012067928B2

(12) United States Patent
Liu et al.

(10) Patent No.: US 12,067,928 B2
(45) Date of Patent: Aug. 20, 2024

(54) FLICKER ADJUSTMENT METHOD OF FREQUENCY CONVERSION DISPLAY DEVICE AND FREQUENCY CONVERSION DISPLAY DEVICE

(71) Applicant: TCL CHINA STAR OPTOELECTRONICS TECHNOLOGY CO., LTD., Shenzhen (CN)

(72) Inventors: Jinfeng Liu, Shenzhen (CN); Yue Fan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/623,583

(22) PCT Filed: Nov. 2, 2021

(86) PCT No.: PCT/CN2021/128103
§ 371 (c)(1),
(2) Date: Dec. 28, 2021

(87) PCT Pub. No.: WO2023/040014
PCT Pub. Date: Mar. 23, 2023

(65) Prior Publication Data

US 2024/0046851 A1 Feb. 8, 2024

(30) Foreign Application Priority Data

Sep. 16, 2021 (CN) ......................... 202111088401.3

(51) Int. Cl.
*G09G 3/20* (2006.01)

(52) U.S. Cl.
CPC ... *G09G 3/2096* (2013.01); *G09G 2320/0247* (2013.01); *G09G 2340/00* (2013.01); *G09G 2340/0435* (2013.01); *G09G 2360/16* (2013.01)

(58) Field of Classification Search
CPC ...... G09G 3/2096; G09G 3/3648; G09G 3/20; G09G 2320/0247; G09G 2340/00; G09G 2340/0435; G09G 2360/16
See application file for complete search history.

(56) References Cited

U.S. PATENT DOCUMENTS

2009/0058763 A1* 3/2009 Doi ...................... G09G 3/3688 345/55
2013/0321254 A1* 12/2013 Kim ..................... G09G 3/3406 345/102

(Continued)

FOREIGN PATENT DOCUMENTS

CN 107358933 A 11/2017
CN 111312149 A 6/2020

(Continued)

OTHER PUBLICATIONS

PCT International Search Report for International Application No. PCT/CN2021/128103, mailed on May 26, 2022, 7pp.

(Continued)

*Primary Examiner* — Christopher E Leiby
(74) *Attorney, Agent, or Firm* — The Roy Gross Law Firm, LLC; Roy Gross

(57) ABSTRACT

The present application provides a flicker adjustment method of a frequency conversion display device and frequency conversion display device, by the time controller detect and count the frame number or the total time length of the image frames that are continuous with the same frame rate, and compare the frame number or the total time length to a predetermined constant frequency determination thresh- (Continued)

old value, when the frame number or the total time length is equal to or greater than the predetermined constant frequency determination threshold value, the white tracking compensation table corresponding to each of the image frames that are continuous with the same frame rate is revised as the same white tracking compensation table. Therefore, the present application avoids the issues of flickering images, achieves the goal of lowered flickering images of the frequency conversion display device and improvement of display quality.

20 Claims, 3 Drawing Sheets

(56) References Cited

U.S. PATENT DOCUMENTS

2018/0151109 A1* 5/2018 Shim ........................ G09G 3/32
2022/0093048 A1* 3/2022 Lee ...................... G09G 3/3225
2022/0319458 A1* 10/2022 Jeong ................... G09G 3/3618
2022/0415269 A1* 12/2022 Liu ...................... G09G 3/3406
2023/0075226 A1* 3/2023 Lee ...................... G09G 3/2096
2023/0410767 A1* 12/2023 Chen ...................... G09G 5/377

FOREIGN PATENT DOCUMENTS

CN 111640390 A 9/2020
CN 111640402 A 9/2020
CN 112542124 A 3/2021
KR 20070032617 A 3/2007
KR 20160084035 A 7/2016
KR 20190098296 A 8/2019
KR 20200053365 A 5/2020

OTHER PUBLICATIONS

PCT Written Opinion of the International Searching Authority for International Application No. PCT/CN2021/128103, mailed on May 26, 2022, 8pp.

Korean Office Action issued in corresponding Korean Patent Application No. 10-2021-7038190 dated Sep. 29, 2022, pp. 1-7, 18pp.

* cited by examiner

FLICKER ADJUSTMENT METHOD OF FREQUENCY CONVERSION DISPLAY DEVICE AND FREQUENCY CONVERSION DISPLAY DEVICE

CROSS REFERENCE TO RELATED APPLICATIONS

This application is a National Phase of PCT Patent Application No. PCT/CN2021/128103 having International filing date of Nov. 2, 2021, which claims the benefit of priority Chinese Application No. 202111088401.3, filed on Sep. 16, 2021. The contents of the above applications are all incorporated by reference as if fully set forth herein in their entirety.

FIELD OF INVENTION

The present application relates to a field of display panels, especially to a flicker adjustment method of a frequency conversion display device and a frequency conversion display device.

BACKGROUND OF INVENTION

A conventional thin film transistor liquid crystal device (TFT-LCD), for example, a gaming display device and a commercial display device, is usually a frequency conversion display device and comprises a frequency conversion function, for example, comprising the Freesync function invented by Advanced Micro Devices (AMD), Inc, namely a graphics processing chip provides image data with different frame rates according to display contents for a frequency conversion display device to display.

With reference to FIG. 1, the above frequency conversion display device, to prevent an issue of brightness bias due to the Freesync function, employs a plurality of white tracking (WT) compensation tables for improvement. A time controller (TCON) of the frequency conversion display device is stored with a plurality of white tracking compensation tables corresponding to a plurality of frame rate ranges. For example, the frequency conversion display device comprises four white tracking compensation tables WT1, WT2, WT3, WT4 corresponding to four frame rate ranges of 48-72 Hz, 72-108 Hz, 108-126 Hz, 126-144 Hz. When the frequency conversion display device operates under a frequency conversion mode, the TCON constantly detects a frame rate of image data, and one of the white tracking compensation tables as a white tracking compensation table according to frame rate is selected.

With reference to FIG. 2, when the graphics processing chip operates under a constant frequency mode, the TCON of the frequency conversion display device still maintain a detection way of the frequency conversion mode, constantly detects the frame rate of the image data and selects a correspond white tracking compensation table. Under such circumstance, when the image data provided by the graphics processing chip is fixed at a threshold frame rate between adjacent frame rate ranges, for example, 72 Hz, the TCON constantly renewing the corresponding white tracking compensation table results in jump variation of the white tracking compensation tables WT1 and WT2. The used white tracking compensation table would switch between two white tracking compensation tables when images displayed by the frequency conversion display device are at the threshold frequency, which causes jump variation of image brightness and further results in an issue of flickering images.

SUMMARY OF INVENTION

Technical Issue

The present invention provides a flicker adjustment method of a frequency conversion display device and a frequency conversion display device to solve an issue of flickering images of the conventional frequency conversion display device having an image frame rate fixed at a threshold frequency.

Technical Solution

In an aspect, the embodiment of the present application provides a flicker adjustment method of a frequency conversion display device, wherein the method comprises:

a frame rate detection step comprising determining a corresponding frame rate of each image frame according to a plurality of data of image frames stored in a time controller, and designating one of a plurality of white tracking compensation tables corresponding to different frame rate ranges in the time controller as a corresponding white tracking compensation table according to the corresponding frame rate;

a constant frequency determination step comprising counting a frame number or a total time length of the image frames that are continuous with the same frame rate, and comparing the frame number or the total time length to a predetermined constant frequency determination threshold value, wherein when the frame number or the total time length is less the predetermined constant frequency determination threshold value, it is determined that the image frames that are continuous are in a frequency conversion state; and when the frame number or the total time length is equal to or greater than the predetermined constant frequency determination threshold value, it is determined that the image frames that are continuous are in a constant frequency state, and the white tracking compensation table corresponding to each of the image frames that are continuous with the same frame rate is revised as a white tracking compensation table corresponding to a first one of the image frames that are continuous with the same frame rate; and a data process step comprising by the time controller performing a data white tracking compensation process to the data of the image frame according to the white tracking compensation table corresponding to each image frame, and outputting the data of the image frame to a display panel.

In some embodiments of the present application, the frame rate detection step further comprises by the time controller detecting a time of the data of each of the image frames reaching the time controller, and serving a reciprocal of a difference between a reaching time of the data of the image frame and a reaching time of data of a next image frame as the corresponding frame rate of the image frame.

In some embodiments of the present application, the time controller further stores a frame rate-vertical blank interval time length correspondence table, the frame rate-vertical blank interval time length correspondence table records vertical blank interval time lengths of the data of the image frames provided to the display panel corresponding to the frame rates and provided to the display panel.

In some embodiments of the present application, the constant frequency determination step further comprises by a counter counting the frame number or the total time length of the image frames that are continuous with the same frame rate; wherein when the frame number or the total time length is equal to or greater than the predetermined constant frequency determination threshold value, the counter is zeroed.

In some embodiments of the present application, in the frame rate detection step, the step of designating one of the white tracking compensation tables corresponding to different frame rate ranges stored in the time controller as a corresponding white tracking compensation table according to the corresponding frame rate comprises mapping a code representing the corresponding white tracking compensation table to the image frame, and the data process step comprises calling the corresponding white tracking compensation table to perform the data white tracking compensation process to the data of the image frame according to the code mapping each image frame.

In another aspect, the embodiment of the present application provides a frequency conversion display device, wherein the frequency conversion display device comprises:

a display panel configured to display image frames; and a time controller connected to the display panel, and comprising:

a storage unit configured to store a plurality of white tracking compensation tables corresponding to different frame rate ranges and a plurality of data of image frames received by the time controller;

a frame rate detection module configured to determine a corresponding frame rate of each image frame according to the data of the image frames stored in the storage unit, and designate one of the white tracking compensation table as a corresponding white tracking compensation table according to the corresponding frame rate; and a constant frequency determination module configured to count a frame number or a total time length of the image frames that are continuous with the same frame rate in the data of the image frames stored in the storage unit, and compare the frame number or the total time length to a predetermined constant frequency determination threshold value; wherein when the frame number or the total time length is less the predetermined constant frequency determination threshold value, the constant frequency determination module determines that the data of the image frames are in a frequency conversion state; and when the frame number or the total time length is equal to or greater than the predetermined constant frequency determination threshold value, the constant frequency determination module determines that the image frames are in a constant frequency state, and the white tracking compensation table corresponding to each of the image frames that are continuous with the same frame rate is revised as a white tracking compensation table corresponding to a first one of the image frames that are continuous with the same frame rate; and a data process module configured to perform the data white tracking compensation process to the data of the image frame according to the white tracking compensation table corresponding to each image frame, and output the image frame to the display panel.

In some embodiments of the present application, the frame rate detection module is configured to detect a time of the data of each of the image frames reaching the time controller, and serve a reciprocal of a difference between a reaching time of the data of the image frame and a reaching time of data of a next image frame as the corresponding frame rate of the image frame.

In some embodiments of the present application, the storage unit further stores a frame rate-vertical blank interval time length correspondence table, the frame rate-vertical blank interval time length correspondence table records vertical blank interval time lengths of the data of the image frames corresponding to the frame rates and provided to the display panel.

In some embodiments of the present application, the constant frequency determination module comprises a counter configured to count the frame number or the total time length of the image frames that are continuous with the same frame rate; wherein when the frame number or the total time length is equal to or greater than the predetermined constant frequency determination threshold value, reset the counter as zero.

In some embodiments of the present application, the frame rate detection module is configured to map a code representing the corresponding white tracking compensation table to the image frame according to the corresponding frame rate, and the data process module is configured to call the corresponding white tracking compensation table to perform the data white tracking compensation process to the data of the image frame according to the code mapping each image frame.

Advantages

The present application at least comprises advantages as follows:

The flicker adjustment method of a frequency conversion display device and frequency conversion display device provided by the present application by the time controller detect and count the frame number or the total time length of the image frames that are continuous with the same frame rate, and compare the frame number or the total time length to a predetermined constant frequency determination threshold value. When the frame number or the total time length is equal to or greater than the predetermined constant frequency determination threshold value, the white tracking compensation table corresponding to each of the image frames that are continuous with the same frame rate is revised as the white tracking compensation table corresponding to a first one of the image frames that are continuous with the same frame rate. Through the above technical solution, the present application solves the technical issue of when a frame rate of an image displayed by the conventional frequency conversion display device is at a threshold frequency, a current white tracking compensation table adopted by the image would jump and vary between two white tracking compensation tables to cause jump variation of the brightness to further result in flickering images, achieves the goal of lowered flickering images of the frequency conversion display device and improvement of display quality.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
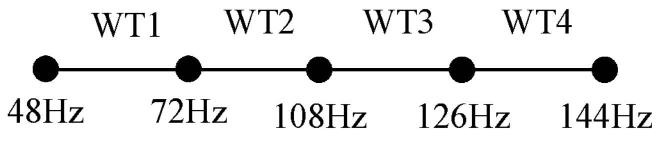
FIG. 1 PRIOR ART
FIG. 1 is a schematic view of frame rate ranges and corresponding white tracking compensation tables of a conventional frequency conversion display device.
Figure 2:
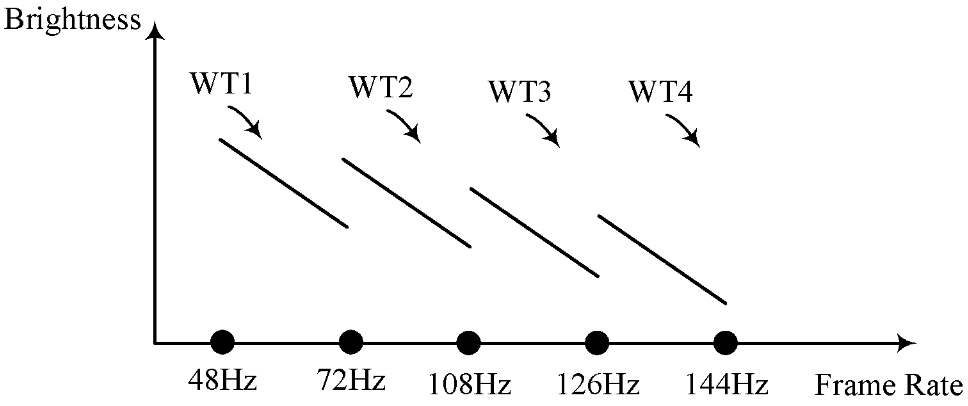
FIG. 2 PRIOR ART
FIG. 2 is a brightness-frame rate variation relationship chart of images displayed on the conventional frequency conversion display device at different frame rates with different white tracking compensation tables.
Figure 3:
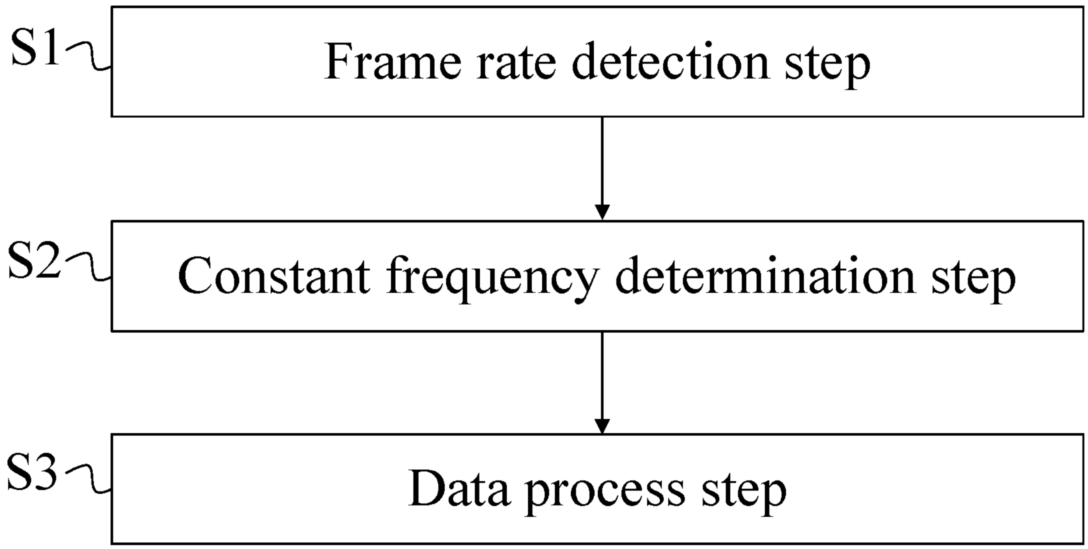
FIG. 3 is a step flowchart of flicker adjustment method of a frequency conversion display device of the present application.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The present invention provides a flicker adjustment method of a frequency conversion display device and a frequency conversion display device configured to solve the issues of the flickering images of the conventional frequency conversion display device at a constant frequency.

In an aspect, the embodiment of the present application provides a flicker adjustment method of a frequency conversion display device, the method comprises: a frame rate detection step S1, a constant frequency determination step S2, and a data process step S3.

The frame rate detection step S1 comprises determining a corresponding frame rate of each image frame according to a plurality of data of image frames stored in a time controller Tcon, and designating one of a plurality of white tracking compensation tables stored in the time controller Tcon and corresponding to different frame rate ranges as a corresponding white tracking compensation table according to the corresponding frame rate.

The constant frequency determination step S2 comprises counting the frame number or the total time length of the image frames that are continuous with the same frame rate, and compare the frame number or the total time length to a predetermined constant frequency determination threshold value N; when the frame number or the total time length is less than the predetermined constant frequency determination threshold value N, determining that the image frames that are continuous are in a frequency conversion state; when the frame number or the total time length is equal to or greater than the predetermined constant frequency determination threshold value N, determining that the image frames that are continuous are in constant frequency state, and the white tracking compensation table corresponding to each of the image frames that are continuous with the same frame rate is revised as a white tracking compensation table corresponding to a first one of the image frames that are continuous with the same frame rate. The predetermined constant frequency determination threshold value N can be a frame number or a time length, and can be defined based on a precondition of a manufacturer having sufficient tests and experiments to the display panel D.

The above frequency conversion state refers to continuous variation of a frame rate corresponding to the image frames outputted by the frequency conversion display device. In a specific embodiment, the frequency conversion display device is connected to a graphic output device, for example, a graphic card, and receives an image data signal transmitted by the graphic output device. A transmission speed of the image data signal is frame per second (FPS), the FPS usually varies according to calculation condition of the graphic output device. When data calculated by the graphic output device is complicated, the FPS decreases, otherwise the FPS increases. Therefore, under the frequency conversion state, the frequency conversion display device can be adjusted to the same frame rate in time according to the FPS to further prevent split image frames or other abnormal display issues. The above constant frequency state refers to that a frame rate corresponding to the image frames outputted by the frequency conversion display device keeps constant.

The data process step S3 comprises by the time controller Tcon performing the data white tracking compensation process to the data of the image frame according to the white tracking compensation table corresponding to each image frame, and outputting the data of the image frame to the display panel D.

In some embodiments of the present application, the frame rate detection step S1 further comprises further comprises by the time controller Tcon detecting a time of the data of each of the image frames reaching the time controller, and serving a reciprocal of a difference between a reaching time of the data of the image frame and a reaching time of data of a next image frame as the corresponding frame rate of the image frame.

In some embodiments of the present application, the time controller Tcon further stores a frame rate-vertical blank interval time length correspondence table, the frame rate-vertical blank interval time length correspondence table records vertical blank interval time lengths of the data of the image frames corresponding to the frame rates and provided to the display panel.

In some embodiments of the present application, the constant frequency determination step S2 further comprises by a counter counting the frame number or the total time length of the image frames that are continuous with the same frame rate; wherein when the frame number or the total time length is equal to or greater than the predetermined constant frequency determination threshold value N, reset the counter as zero.

Figure 4:
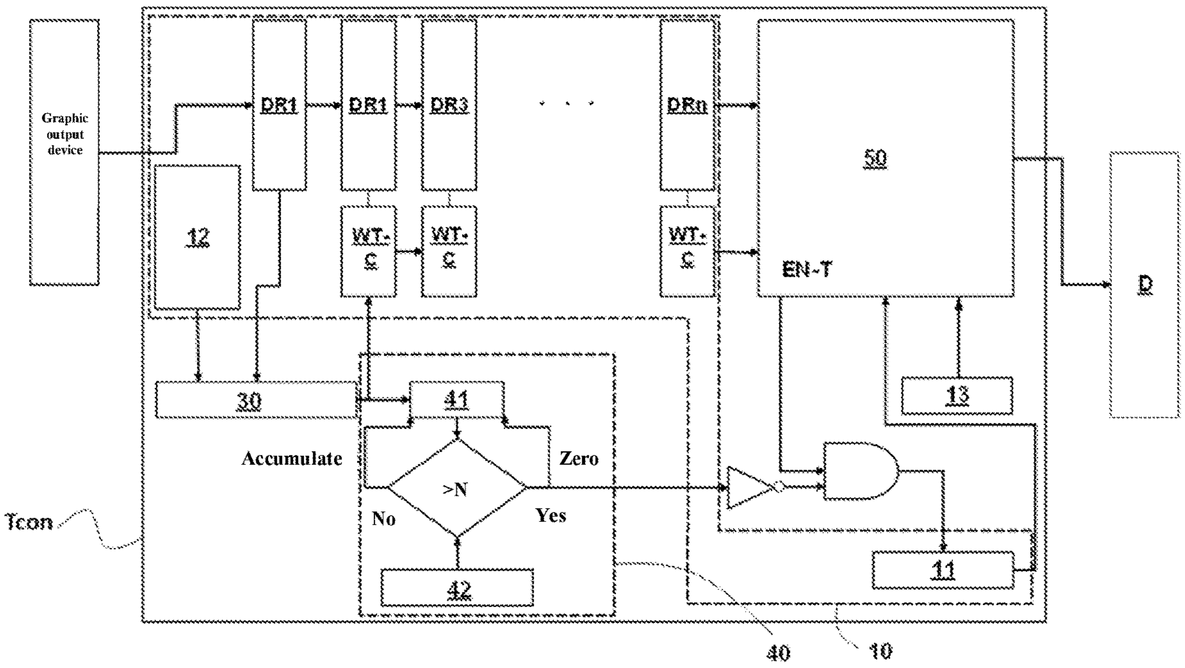
FIG. 4 is a block diagram of a frequency conversion display device corresponding to the flicker adjustment method of a frequency conversion display device in FIG. 3 of the present application.

With reference to FIG. 4, in some embodiments of the present application, in the frame rate detection step S1, the step of designating one of the white tracking compensation tables corresponding to different frame rate ranges stored in the time controller Tcon as a corresponding white tracking compensation table according to the corresponding frame rate comprises mapping a code representing the corresponding white tracking compensation table to the image frame, and the data process step comprises calling the corresponding white tracking compensation table to perform the data white tracking compensation process to the data of the image frame according to the code mapping each image frame.

In another aspect, the embodiment of the present application provides a frequency conversion display device, the frequency conversion display device comprises: a display panel D and a time controller Tcon.

The display panel D is configured to display image frames.

The time controller Tcon is connected to the display panel D, and comprises: storage unit 10, frame rate detection module 30, constant frequency determination module 40, and data process module 50.

The storage unit 10 is configured to store a plurality of white tracking compensation tables corresponding to different frame rate ranges 11 and a plurality of data of image frames received by the time controller Tcon from the graphic output device. In particular, the data of the image frames, for example, is stored in a frame data buffer DR1-DRn. The storage unit 10 is further configured to store a frame rate-white tracking compensation table correspondence table 12 and a frame rate-vertical blank interval time length correspondence table 13. The frame rate-white tracking compensation table correspondence table 12 records codes of white tracking compensation tables corresponding to different frame rate ranges. The frame rate-vertical blank interval time length correspondence table 13 records, based on the data of the image frame corresponding to each of the different frame rates, a vertical blank interval time length of each image frame that should be provided by the time controller Tcon for transmitting the data of the image frame to the display panel D.

The frame rate detection module 30 is configured to determine a corresponding frame rate of each image frame according to the data of the image frames stored in the storage unit 10, and designate one of the white tracking compensation table as a corresponding white tracking compensation table according to the corresponding frame rate. In particular, the frame rate detection module 30 is configured to detect a time of the data of each of the image frames reaching the time controller Tcon, serve a reciprocal of a difference between a reaching time of the data of the image frame and a reaching time of data of a next image frame as the corresponding frame rate of the image frame, designate one of the frame rate-white tracking compensation table correspondence tables 12 as the corresponding white tracking compensation table according to the corresponding frame rate, and map a code of the corresponding white tracking compensation table to the frame data buffer DR1-DRn storing the image frame. In particular, each of the frame data buffers DR1-DRn further comprises a storage bit WT-C including several bits for storing the code. The frame rate detection module 30 store the code of the corresponding white tracking compensation table to the storage bit WT-C.

The constant frequency determination module 40 is configured to count a frame number or a total time length of the image frames that are continuous with the same frame rate in the data of the image frames stored in the storage unit 10, and compare the frame number or the total time length to a predetermined constant frequency determination threshold value N. When the frame number or the total time length is less than the predetermined constant frequency determination threshold value N, the constant frequency determination module 40 that the data of the image frames are in a frequency conversion state, the data process module 50 calls the white tracking compensation table 11 according to the code stored in the storage bit WT-C of the frame data buffer DR1-DRn, the constant frequency determination module 40 has no interference with a calling process of the above white tracking compensation table 11. When the frame number or the total time length is equal to or greater than the predetermined constant frequency determination threshold value N, the constant frequency determination module 40 determines that the image frames are in a constant frequency state, and the white tracking compensation table corresponding to each of the image frames that are continuous with the same frame rate is revised as a white tracking compensation table corresponding to a first one of the image frames that are continuous with the same frame rate.

The data process module 50 is configured to perform the data white tracking compensation process to the data of the image frame according to the white tracking compensation table corresponding to each image frame, and output the image frame to the display panel D.

In particular, the data process module 50 transmits a white tracking compensation table enabling signal EN-T according to the code stored in the storage bit WT-C to call the white tracking compensation table 11. When the frame number or the total time length is equal to or greater than the predetermined constant frequency determination threshold value N, the constant frequency determination module 40 transmits a signal to counter offset white tracking compensation table enabling signal EN-T such that the data process module 50 is unable to obtain a renewed white tracking compensation table according to the code stored in the storage bit WT-C but can only compensate the date according to the current white tracking compensation table. Namely, only the white tracking compensation table corresponding to the first one of the image frames that are continuous with the same frame rate can be used to compensate the data.

In particular, FIG. 4 shows logic block diagrams that the constant frequency determination module 40 transmits a signal to offset the white tracking compensation table enabling signal EN-T, it is only exemplary and the present invention is not limited thereto. The constant frequency determination module 40, when determining that a number stored in the counter 41 is greater than the predetermined constant frequency determination threshold value N, emits a high level to an inverter to zero the counter 41. The inverter changes the high level to a low level, and the low level and the white tracking compensation table enabling signal EN-T are both inputted into an "AND" gate. Because the "AND" gate has two ends, each of which is a high level of the white tracking compensation table enabling signal EN-T and the other of which is a low level, the "AND" gate outputs the low level to the white tracking compensation table 11 such that the white tracking compensation table 11 stops providing data to the data process module 50. The data process module 50 only stores the previously called white tracking compensation table for compensation of the data.

In some embodiments of the present application, the storage unit 10 further stores a frame rate-vertical blank interval time length correspondence table 13, the frame rate-vertical blank interval time length correspondence table records vertical blank interval time lengths of the data of the image frames corresponding to the frame rates and provided to the display panel D. The data process module 50 records the data of the image frame corresponding to different frame rates according to the frame rate-vertical blank interval time length correspondence table 13, and provides a vertical blank interval time length corresponding to the time length in each frame to transmit the data of the image frame to the display panel D.

In particular, the data of the image frame attached with the vertical blank interval time length can make the display panel D to show a corresponding frame rate.

In some embodiments of the present application, the constant frequency determination module 40 comprises a counter 41 configured to count the frame number or the total time length of the image frames that are continuous with the same frame rate in the data of the image frames, and a predetermined constant frequency determination threshold value buffer 42 configured to store a predetermined constant frequency determination threshold value N. The predetermined constant frequency determination threshold value N can be designated or set by a user. In particular, after the frame rate detection module 30 calculates the corresponding frame rate of the image frame, for the image frame the same frame rate, the frame rate detection module 30 provides signal to make the counter 41 carry. The constant frequency determination module 40 compares the frame number or the total time length and the predetermined constant frequency determination threshold value N. When the frame number or the total time length is less than the predetermined constant frequency determination threshold value N, the constant frequency determination module 40 continues a Cumulative procedure of the counter 41. When the frame number or the total time length is equal to or greater than the predetermined constant frequency determination threshold value N, the constant frequency determination module 40 zeros the counter 41 and transmits a signal to the white tracking compensation table 11 of the storage unit 10 to stop calling the white tracking compensation table 11.

The present application at least comprises advantages as follows:

The flicker adjustment method of a frequency conversion display device and frequency conversion display device provided by the present application, by the time controller Tcon count the frame number or the total time length of the image frames that are continuous with the same frame rate, and compare the frame number or the total time length to a predetermined constant frequency determination threshold value N. When the frame number or the total time length is equal to or greater than the predetermined constant frequency determination threshold value N, the white tracking compensation table corresponding to each of the image frames that are continuous with the same frame rate is revised as the white tracking compensation table corresponding to a first one of the image frames that are continuous with the same frame rate. Through the above technical solution, the present application solves the technical issue of when a frame rate of an image displayed by the conventional frequency conversion display device is at a threshold frequency, a current white tracking compensation table adopted by the image would jump and vary between two white tracking compensation tables to cause jump variation of the brightness to further result in flickering images, achieves the goal of lowered flickering images of the frequency conversion display device and improvement of display quality.

The pixel unit of the display panel and the display panel provided by the embodiment of the present application are described in detail. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A flicker adjustment method of a frequency conversion display device, comprising:

a frame rate detection step comprising determining a corresponding frame rate of each image frame according to a plurality of data of image frames stored in a time controller, and designating one of a plurality of white tracking compensation tables corresponding to different frame rate ranges in the time controller as a corresponding white tracking compensation table according to the corresponding frame rate;

a constant frequency determination step comprising counting a frame number or a total time length of the image frames that are continuous with the same frame rate, and comparing the frame number or the total time length to a predetermined constant frequency determination threshold value, wherein when the frame number or the total time length is equal to or greater than the predetermined constant frequency determination threshold value, it is determined that the image frames that are continuous are in a constant frequency state, and the white tracking compensation table corresponding to each of the image frames that are continuous with the same frame rate is revised as a white tracking compensation table corresponding to a first one of the image frames that are continuous with the same frame rate; and a data process step comprising performing a data white tracking compensation process to the data of the image frame according to the white tracking compensation table corresponding to each image frame, and outputting the data of the image frame to a display panel.

2. The flicker adjustment method of a frequency conversion display device according to claim 1, wherein the frame rate detection step further comprises, detecting a time of the data of each of the image frames reaching the time controller, and serving a reciprocal of a difference between a reaching time of the data of the image frame and a reaching time of data of a next image frame as the corresponding frame rate of the image frame.

3. The flicker adjustment method of a frequency conversion display device according to claim 2, wherein the time controller further stores a frame rate-vertical blank interval time length correspondence table, the frame rate-vertical blank interval time length correspondence table records vertical blank interval time lengths of the data of the image frames provided to the display panel corresponding to the frame rates.

4. The flicker adjustment method of a frequency conversion display device according to claim 1, wherein the constant frequency determination step further comprises counting the frame number or the total time length of the image frames that are continuous with the same frame rate; wherein when the frame number or the total time length is equal to or greater than the predetermined constant frequency determination threshold value, the counter is zeroed.

5. The flicker adjustment method of a frequency conversion display device according to claim 1, wherein in the frame rate detection step, the step of designating one of the white tracking compensation tables corresponding to different frame rate ranges stored in the time controller as a corresponding white tracking compensation table according to the corresponding frame rate comprises:

mapping a code representing the corresponding white tracking compensation table to the image frame, and the data process step comprises calling the corresponding white tracking compensation table to perform the data white tracking compensation process to the data of the image frame according to the code mapping to each image frame.

6. The flicker adjustment method of a frequency conversion display device according to claim 1, wherein the constant frequency determination step further comprises, when the frame number or the total time length is less the predetermined constant frequency determination threshold value, it is determined that the image frames that are continuous are in a frequency conversion state.

7. A frequency conversion display device, comprising:

a display panel configured to display image frames; and a time controller connected to the display panel, and comprising:

a storage unit configured to store a plurality of white tracking compensation tables corresponding to different frame rate ranges and a plurality of data of image frames received by the time controller;

a frame rate detection module configured to determine a corresponding frame rate of each image frame according to the data of the image frames stored in the storage unit, and designate one of the white tracking compensation table as a corresponding white tracking compensation table according to the corresponding frame rate; and a constant frequency determination module configured to count a frame number or a total time length of the image frames that are continuous with the same frame rate in the data of the image frames stored in the storage unit, and compare the frame number or the total time length to a predetermined constant frequency determination threshold value; wherein;

and when the frame number or the total time length is equal to or greater than the predetermined constant frequency determination threshold value, the constant frequency determination module determines that the image frames are in a constant frequency state, and the white tracking compensation table corresponding to each of the image frames that are continuous with the same frame rate is revised as the white tracking compensation table corresponding to a first one of the image frames that are continuous with the same frame rate; and a data process module configured to perform the data white tracking compensation process to the data of the image frame according to the white tracking compensation table corresponding to each image frame, and output the image frame to the display panel.

8. The frequency conversion display device according to claim 7, wherein the frame rate detection module is configured to detect a time of the data of each of the image frames reaching the time controller, and serve a reciprocal of a difference between a reaching time of the data of the image frame and a reaching time of data of a next image frame as the corresponding frame rate of the image frame.

9. The frequency conversion display device according to claim 8, wherein the storage unit further stores a frame rate-vertical blank interval time length correspondence table, the frame rate-vertical blank interval time length correspondence table records vertical blank interval time lengths of the data of the image frames corresponding to the frame rates and provided to the display panel.

10. The frequency conversion display device according to claim 7, wherein the constant frequency determination module comprises a counter configured to count the frame number or the total time length of the image frames that are continuous with the same frame rate; wherein when the frame number or the total time length is equal to or greater than the predetermined constant frequency determination threshold value, reset the counter as zero.

11. The frequency conversion display device according to claim 7, wherein the frame rate detection module is configured to map a code representing the corresponding white tracking compensation table to the image frame according to the corresponding frame rate, and the data process module is configured to call the corresponding white tracking compensation table to perform the data white tracking compensation process to the data of the image frame according to the code mapping each image frame.

12. The frequency conversion display device according to claim 11, wherein the data process module transmits a white tracking compensation table enabling signal according to the code stored in a storage bit to call the white tracking compensation table.

13. The frequency conversion display device according to claim 12, wherein when the frame number or the total time length is equal to or greater than the predetermined constant frequency determination threshold value, the constant frequency determination module transmits a signal to counter offset white tracking compensation table enabling signal such that the data process module is unable to obtain a renewed white tracking compensation table according to the code stored in the storage bit but can only compensate the date according to a current white tracking compensation table.

14. The frequency conversion display device according to claim 13, wherein the constant frequency determination module, when determining that a number stored in the counter is greater than the predetermined constant frequency determination threshold value, emits a high level to an inverter and zeros the counter.

15. The frequency conversion display device according to claim 14, wherein the inverter changes the high level to a low level, and the low level and the white tracking compensation table enabling signal are both inputted into an "AND" gate.

16. The frequency conversion display device according to claim 15, wherein when the frame number or the total time length is less the predetermined constant frequency determination threshold value, the constant frequency determination module determines that the data of the image frames are in a frequency conversion state.

17. A flicker adjustment method of a frequency conversion display device, comprising:

a frame rate detection step comprising determining a corresponding frame rate of each image frame according to a plurality of data of image frames stored in a time controller, and designating one of a plurality of white tracking compensation tables corresponding to different frame rate ranges in the time controller as a corresponding white tracking compensation table according to the corresponding frame rate;

a constant frequency determination step comprising counting a frame number or a total time length of the image frames that are continuous with the same frame rate, and comparing the frame number or the total time length to a predetermined constant frequency determination threshold value, wherein when the frame number or the total time length is less the predetermined constant frequency determination threshold value, it is determined that the image frames that are continuous are in a frequency conversion state; and when the frame number or the total time length is equal to or greater than the predetermined constant frequency determination threshold value, it is determined that the image frames that are continuous are in a constant frequency state, and the white tracking compensation table corresponding to each of the image frames that are continuous with the same frame rate is revised as a white tracking compensation table corresponding to a first one of the image frames that are continuous with the same frame rate; and a data process step comprising performing a data white tracking compensation process to the datum of the image frame according to the white tracking compensation table corresponding to each image frame, and outputting the datum of the image frame to a display panel;

wherein the frame rate detection step further comprises detecting a time of the datum of each of the image frames reaching the time controller, and serving a reciprocal of a difference between a reaching time of the datum of the image frame and a reaching time of datum of a next image frame as the corresponding frame rate of the image frame.

18. The flicker adjustment method of a frequency conversion display device according to claim 17, wherein the time controller further stores a frame rate-vertical blank interval time length correspondence table, the frame rate-vertical blank interval time length correspondence table records vertical blank interval time lengths of the datum of the image frames provided to the display panel corresponding to the frame rates.

19. The flicker adjustment method of a frequency conversion display device according to claim 17, wherein the constant frequency determination step further comprises counting the frame number or the total time length of the image frames that are continuous with the same frame rate; wherein when the frame number or the total time length is equal to or greater than the predetermined constant frequency determination threshold value, the counter is zeroed.

20. The flicker adjustment method of a frequency conversion display device according to claim 17, wherein in the frame rate detection step, the step of designating one of the white tracking compensation tables corresponding to different frame rate ranges stored in the time controller as a corresponding white tracking compensation table according to the corresponding frame rate comprises:

mapping a code representing the corresponding white tracking compensation table to the image frame; and the data process step comprises calling the corresponding white tracking compensation table to perform the data white tracking compensation process to the data of the image frame according to the code mapping to each image frame.

* * * * *